US012688721B2

(12) United States Patent
Tran et al.

(10) Patent No.: US 12,688,721 B2
(45) Date of Patent: Jul. 21, 2026

(54) DETECTING A CONDITION FOR A CULTURE DEVICE USING A MACHINE LEARNING MODEL

(71) Applicant: NEOGEN FOOD SAFETY US HOLDCO CORPORATION, Lansing, MI (US)

(72) Inventors: Thanh Quoc Tran, Blaine, MN (US); Hugh Eugene Watson, Prior Lake, MN (US); Jitesh Narendra Joshi, Gujarat (IN); Abhilash S K, Bangalore (IN); Rohit Kumar Tiwari, Roorkee Uttarakhand (IN)

(73) Assignee: NEOGEN FOOD SAFETY US HOLDCO CORPORATION, Washington, DC (US)

( * ) Notice: Subject to any disclaimer, the term of this patent is extended or adjusted under 35 U.S.C. 154(b) by 438 days.

(21) Appl. No.: 17/904,856

(22) PCT Filed: May 12, 2021

(86) PCT No.: PCT/IB2021/054062
§ 371 (c)(1),
(2) Date: Aug. 23, 2022

(87) PCT Pub. No.: WO2021/234514
PCT Pub. Date: Nov. 25, 2021

(65) Prior Publication Data
US 2023/0127199 A1 Apr. 27, 2023

(30) Foreign Application Priority Data
May 19, 2020 (IN) .............................. 202041021033

(51) Int. Cl.
*G06V 20/69* (2022.01)
*G06V 10/22* (2022.01)
(Continued)

(52) U.S. Cl.
CPC ............ *G06V 20/698* (2022.01); *G06V 10/22* (2022.01); *G06V 10/454* (2022.01);
(Continued)

(58) Field of Classification Search
CPC .... G06V 20/698; G06V 10/22; G06V 10/454; G06V 10/774; G06V 10/82; G06V 20/52; G06V 20/695; G06F 18/24133
See application file for complete search history.

(56) References Cited

U.S. PATENT DOCUMENTS 9,834,748 B2 * 12/2017 Bolea ...................... C12M 23/44
10,495,563 B1 * 12/2019 Skiffington ........... G06T 7/0016
(Continued)

FOREIGN PATENT DOCUMENTS

JP 2020054247 A * 4/2020

OTHER PUBLICATIONS

Ferrari, Alessandro, Stefano Lombardi, and Alberto Signoroni. "Bacterial colony counting with convolutional neural networks in digital microbiology imaging." Pattern Recognition 61 (2017): 629-640. (Year: 2017).*

(Continued)

*Primary Examiner* — Oneal R Mistry
*Assistant Examiner* — Jongbong Nah
(74) *Attorney, Agent, or Firm* — HYLTON-RODIC LAW PLLC

(57) ABSTRACT

Aspects of the present disclosure relate to a method of processing an input image of a culture device for a condition. The method can include receiving the input image and classifying the input image with a trained machine learning model that is configured to be trained on a training set of images having the condition. The method can include determining that the condition exists in the input image based on
(Continued)

RECEIVE THE IMAGE OF THE CULTURE DEVICE 102

PRE-PROCESS THE IMAGE 104

CLASSIFY THE IMAGE WITH A TRAINED CLASSIFIER THAT IS TRAINED ON A TRAINING SET OF IMAGES EACH HAVING THE CONDITION 106

DETERMINE THAT THE CONDITION EXISTS BASED ON THE CLASSIFICATION 108

PERFORM AT LEAST ONE ACTION IN RESPONSE TO THE DETERMINATION THAT THE CONDITION EXISTS 110 the classification and performing at least one action in response to the determination that the condition exists.

16 Claims, 11 Drawing Sheets

(51) Int. Cl.

| | | |
|---|---|---|
| *G06V 10/44* | (2022.01) | |
| *G06V 10/774* | (2022.01) | |
| *G06V 10/82* | (2022.01) | |
| *G06V 20/52* | (2022.01) | |

(52) U.S. Cl.

CPC ............ *G06V 10/774* (2022.01); *G06V 10/82* (2022.01); *G06V 20/52* (2022.01); *G06V 20/695* (2022.01)

(56) References Cited

U.S. PATENT DOCUMENTS

| | | | | |
|---|---|---|---|---|
| 2018/0089828 A1* | 3/2018 | Wiles | ..................... | C12M 41/46 |
| 2018/0112173 A1* | 4/2018 | Wiles | .................. | G06V 20/698 |
| 2021/0334514 A1* | 10/2021 | Marcelpoil | ............ | G06V 10/24 |
| 2023/0083087 A1* | 3/2023 | Dugan | .................... | C12Q 1/04 |
| | | | | 705/2 |

OTHER PUBLICATIONS

Ren, Shaoqing, et al. "Faster R-CNN: Towards real-time object detection with region proposal networks." IEEE transactions on pattern analysis and machine intelligence 39.6 (2016): 1137-1149. (Year: 2016).*

* cited by examiner

100

RECEIVE THE IMAGE OF THE CULTURE DEVICE 102

PRE-PROCESS THE IMAGE 104

CLASSIFY THE IMAGE WITH A TRAINED CLASSIFIER THAT IS TRAINED ON A TRAINING SET OF IMAGES EACH HAVING THE CONDITION 106

DETERMINE THAT THE CONDITION EXISTS BASED ON THE CLASSIFICATION 108

PERFORM AT LEAST ONE ACTION IN RESPONSE TO THE DETERMINATION THAT THE CONDITION EXISTS 110

RECEIVE A TRAINING SET HAVING PLURALITY OF TRAINING IMAGES
202

PRE-PROCESS THE PLURALITY OF TRAINING IMAGES 204

ESTABLISH GROUND TRUTH FOR A CLASS LABEL WITH A BOUNDING BOX
206

PROVIDE THE TRAINING SET TO A MACHINE LEARNING MODEL 208

ALLOW THE MACHINE LEARNING MODEL TO ANALYZE THE TRAINING SET
210

300

306

304

308

402

306

SUBSTRATE

DETECTING A CONDITION FOR A CULTURE DEVICE USING A MACHINE LEARNING MODEL

CROSS REFERENCE TO RELATED APPLICATIONS

This application is a national stage filing under 35 U.S.C. 371 of PCT/IB2021/054062, filed May 12, 2021, which claims priority to Indian Application No. 202041021033, filed May 19, 2020, the disclosure of which is incorporated by reference in its/their entirety herein.

BACKGROUND

The food industry routinely monitors the levels of indicator groups of microorganisms. These microorganisms are considered quality and hygienic indicators and can pose health hazards to humans. A common method of quantifying indicator microorganisms is identifying and counting colony forming units. The counting can be performed by first culturing target microorganisms on culture devices (e.g., dry film or agar plates), then counting the colony forming units. Colony counts may be done at multiple stages including on incoming materials, in process product, finished product, and environmental samples taken from within the food processing environment.

The colony count data for many purposes can be used to meet regulatory requirements, shelf life claims, reduce spoilage, ensure hygiene of process and facilities, ensure effectiveness of process steps (cooking, pasteurization, decontamination, etc.), or ensure final product is free from contamination which could cause illness.

Counting colonies on growth media and interpretation of these counts can be very complex and can greatly benefit from improvements in colony enumeration devices and software. The unique challenges and requirements in this space which make this a complex effort include A) Media interpretation challenges and accuracy requirements, B) Physical factors of the media, and C) Complexity of data.

BRIEF SUMMARY

Aspects of the present disclosure relate to a method of processing an input image of a culture device for a condition. The method can include receiving the input image and classifying the input image with a trained machine learning model that is trained on a training set of images having the condition. The method can include determining that the condition exists in the input image based on the classification and performing at least one action in response to the determination that the condition exists.

Additional aspects can relate to a colony enumeration device configured to perform the method.

Additional aspects of the present disclosure can relate to a method of training a machine learning model to identify or classify the condition on a culture device. The method can include receiving a training set including a plurality of training images related to a plurality of culture devices. The method can include establishing a ground truth for a class label with a bounding box on at least some of the plurality of training images in the training set. The bounding box can encompass at least a majority of a growth compartment of a culture device on a training image. The class label can be associated with the condition. The method can also include providing the training set to the machine learning model and allowing the machine learning model to analyze the plurality of training images to train the machine learning model and form a trained machine learning model. The trained machine learning model can be provided to the colony enumeration device for processing a plurality of input images.

Additional aspects can relate to a computer configured to perform the method of training the machine learning model.

The above summary of the present disclosure is not intended to describe each disclosed embodiment or every implementation. The description that follows more particularly exemplifies illustrative embodiments. In several places throughout the application, guidance is provided through lists of examples, which examples can be used in various combinations. In each instance, the recited list serves as a representative group and should not be interpreted as an exclusive list.

Additional details of these and other embodiments are set forth in the accompanying drawings and the description below. Other features, objects and advantages will become apparent from the description and drawings, and from the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In some instances, various conditions can occur within culture devices that can interfere with colony enumeration when using machine learning models. For example, one condition that occurs during colony enumeration is referred to as "Too Numerous to Count" which refers to a large load of microorganisms that can cause blurry backgrounds because single colony forming units cannot be isolated. This too numerous to count condition can confuse both traditional machine vision techniques because it is almost indistinguishable from a zero-bacteria culture device (a second condition which the too numerous to count condition can often resemble). In the zero-bacteria culture device, the food is cleared for shipment. In a too numerous to count case, the food can be harmful to consumption and shelf life.

Thus, distinguishing between various conditions such as a zero and a too numerous to count condition are important to health and safety.

Aspects of the present disclosure relate to faster and more consistent identification of various conditions (such as the too numerous to count condition) using a machine learning model specially trained to detect the condition. In particular, the method of training can allow for much more accurate detection of the condition, accurately differentiates between food and/or other factors, and accurately differentiates between various conditions.

Figure 1:
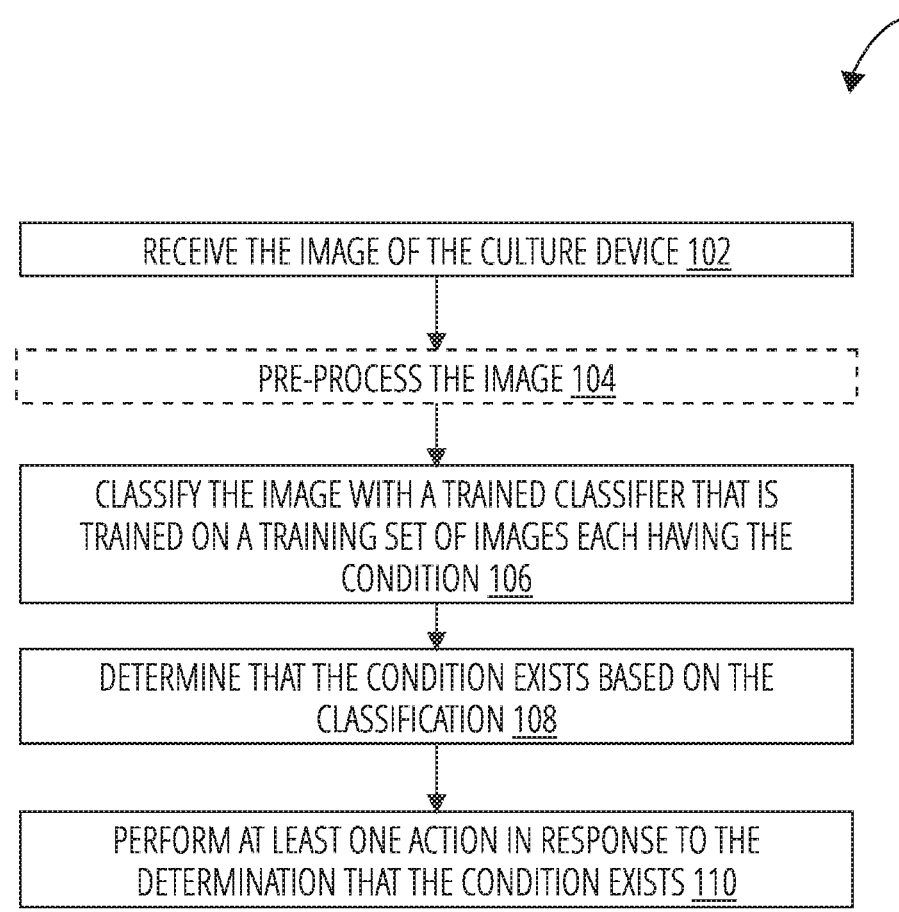
FIG. 1 illustrates a method 100 in accordance with one embodiment.

FIG. 1 illustrates a method 100 of using a trained classifier to determine whether a condition relating to a culture device exists in an image of a culture device. The method 100 can generally involve providing an input image (of a culture device) to the neural network circuitry and receiving a determination that the condition exists within the input image.

Method 100 can begin with block 102. In block 102, the colony enumeration device can receive an input image corresponding to a culture device. The colony enumeration device can include image capture circuitry that captures the input image of a culture device. The image capture circuitry can ensure that the culture device is in focus and appropriately illuminated.

In block 104, the colony enumeration device can optionally pre-process the input image by using image enhancement circuitry. The pre-processing can include various image enhancement techniques that are configured to work with a machine learning model. For example, image enhancement can include flat field normalization, convolutions, sharpening, histogramic equalization, blur, erode, gamma shift, gain, offset adjustments, contrast enhancements, and combinations thereof. Another image enhancement can include image flattening, resizing image shifting, or flipping. The image enhancement is configured to improve detection and classification of microorganisms by the trained machine learning model. Once enhanced, the enhanced images can be stored in the memory.

In block 106, colony enumeration device can classify the input image. The trained machine learning model can include a trained classifier that is trained on a training set of images each having the condition. The trained machine learning model can apply the trained classifier to the input image to determine a probability that the condition exists in the image. The trained machine learning model can be trained on thousands of training images and the method 100 would be physically impossible to be performed by a human. For example, the colony enumeration device can be trained to identify conditions of hundreds of input images within no more than 5 minutes.

In at least one embodiment, the trained machine learning model uses a deep learning model. Various deep learning models can be used to classify images. For example, convolutional neural networks (CNN), deep belief networks, stacked denoising auto-encoders, or deep Boltzmann machines can be used.

The deep learning model can be a Convolutional Neural Network (CNN), or specific CNN frameworks like AlexNet, VGG, Inception, and ResNet. For example, the convolutional reduction of the image can be carried out by the Inception V2 convolutional neural network. The result is faster identification of colony forming units due to the common usage of convoluted data for a regional proposal network (RPN) and classifiers/area regressor/probability generation.

Examples of CNNs useful in the present disclosure include the Region-based Convolution Network 900, Fast Region-based Convolutional Network 1000, and Faster Region-based Convolutional Network 1100 described further herein. The deep learning model can be executed on dedicated neural network circuitry to reduce computation time.

The deep learning model can include a segmentation model such as Regional Proposal Network (RPN) combined with a classifier such as convolutional neural network (CNN). The segmentation model can segment the image into background and foreground, or non-colony forming unit and colony forming unit.

The convolutional neural network can include an input layer, a plurality of hidden layers, and an output layer. The deep learning model does not include only one hidden layer unlike shallow machine learning models.

In at least one embodiment, the deep learning model can initiate a convolutional reduction of the input image (i.e., generate a reduced image) to be further analyzed. An RPN can produce potential areas of foreground (one of the classes) or background (not one of the class) followed by Classifier nets (i.e., a classifier) that generates the probability for each proposal on whether it is one or potentially multiple of our classes and then nets to determine the area of image with a class. The deep learning model can examine at the extent and probability for each class to determine if the condition exists.

The deep learning model can be created using a machine learning framework configured to run on a neural network platform. In at least one embodiment, the deep learning model can be trained to identify a morphological characteristic of a colony forming unit in the image (or combined image), and other conditions. The deep learning model can be trained by a large sample of the variety of each colony type. The deep learning model can determine what morphological characteristic or characteristics to detect. This can include an important difference between image process, human guided training, and the unguided training. The deep learning model can be trained based on multiplicity of training images having an established ground truth.

The deep learning model can be pre-trained in a previous instance and the weights for the hidden layers can be included. The deep learning model is pre-trained on a corpus of identified colony forming units of microorganisms or a corpus of images of culture devices that have the condition as described further herein.

The deep learning model can be different from other machine learning where the deep learning model does not perform only directed feature extraction on an image from the plurality of images. For example, some current methods can use direct feature extraction which is extraction of directed and specific image characteristics guided by a user's attention through specific image processing. The deep learning model can be trained to determine a large number of characteristics that can be beyond human recognition and uses these propose potential areas of foreground (colonies) and background (non-colonies) and is different from directed feature extraction.

While a classifier can be based on neural networks, the trained machine learning model does not necessarily have to use neural networks. For example, feature extraction via image processing can produce the regions and then the too numerous to count condition can be determined by other classifiers such as K-Nearest Neighbor (K-NN) classifier, decision tree classifier, random forest classifier, naive Bayes classifiers, and logistic regression classifiers.

In block 108, the colony enumeration device can determine that the condition exists based on the classification. For example, if the output of the trained machine learning model is a probability that the condition exists in the input image, then the colony enumeration device can determine if the probability is within a threshold. If the threshold is satisfied by the probability, then the colony enumeration device can provide the determination. In at least one embodiment, a second threshold can also be evaluated. In at least one embodiment, the threshold can be established for not only probability, but also a size of the probable area that can be used to determine if the condition is present. For example, if the threshold is 50% within a first area, and the deep learning model provides an 80% probability at a second area that is smaller than the first area that the condition exists, then the colony enumeration device does not flag the condition. Thus, in this example, the first, second threshold, or both can be satisfied.

The condition as described herein can be related to a culture device, such as an image of a culture device. The condition can be a too numerous to count condition as described herein. The condition can also be a zero-colony count condition. For example, a zero-colony count can exist when there are no colony forming units on the culture device. The condition can also be the presence of a liquefier, e.g., where a certain amount of the culture device is covered. The condition can also be a spreader or a pH imbalance of the nutrient medium.

In block 110, the colony enumeration device performs at least one action in response to the determination that the condition exists. For example, the colony enumeration device can communicate to a user interface on an external computer or on a client computer on a display device that the condition exists for the image. The user interface can also be configured to ask further questions with respect to the culture device which can further feed into the reinforcement learning of the deep learning model.

In at least one embodiment, the colony enumeration device can segregate the culture device having the condition from a plurality of culture devices that have/will be analyzed using an (automated) feed mechanism. For example, the colony enumeration device can activate a feed mechanism to eject the culture device from the colony enumeration device. In block 110, the colony enumeration device can also shunt, select, and/or sort the culture device. For example, the colony enumeration device can put the culture device in a different location from a stack of culture devices so that the user can inspect the culture device at a later time.

Figure 2:
FIG. 2 illustrates a method 200 in accordance with one embodiment.
Figure 2:
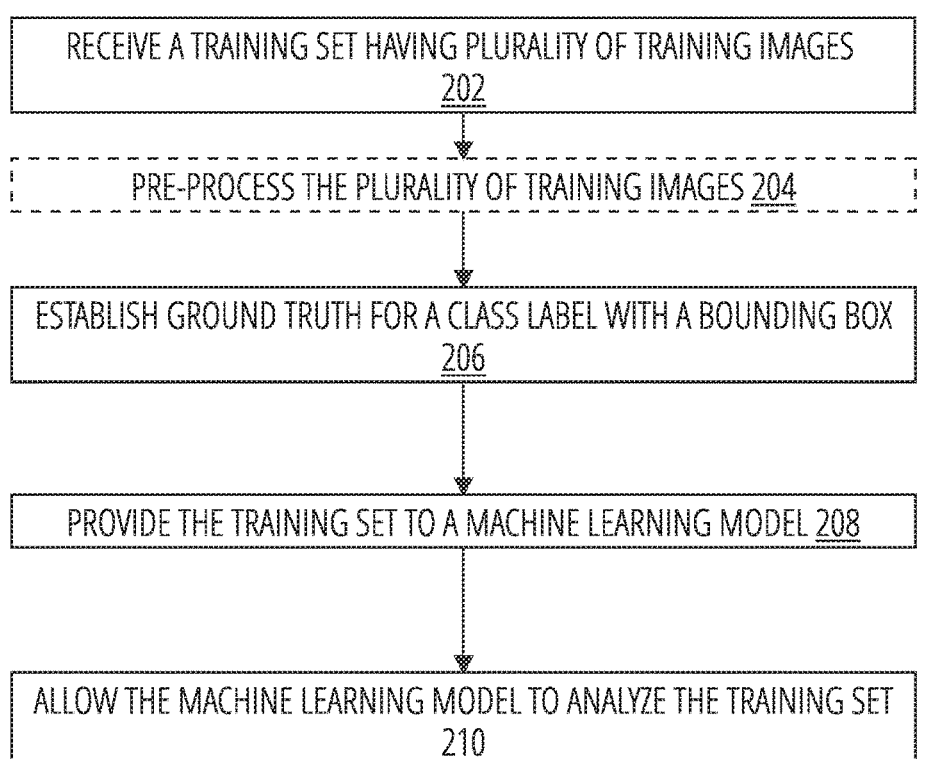

FIG. 2 illustrates a method 200 of training the machine learning model (which includes a classifier) on the training set. Aspects of the present disclosure relate to a training a machine learning model with a plurality of training images having multiple class labels. Additional aspects relate to a bounding box expanded past the colony morphology characteristic and/or the condition on a training image to establish the ground truth of a class label.

The machine learning model can be trained outside of the colony enumeration device or microorganic detection system and can be performed at an earlier time, by another entity, user, or medical facility, or in another setting. For example, the machine learning model can be trained in a different computer and then the trained machine learning model can be uploaded to the microorganic detection system for local use. In at least one embodiment, method 200 can be associated with method 100. For example, the method 200 can occur prior to or separate from method 100. In at least one embodiment, indications of method 200 can be present when a machine learning model is able to determine the condition exists in method 100.

In block 202, the computer can receive a training set that includes a plurality of training images (e.g., from a data store such as a database, or from the memory of the computer). The plurality of training images are associated with a plurality of culture devices each having different conditions. In at least one embodiment, the training set can include a plurality of class labels that are associated with the plurality of training images.

In block 204, the computer can pre-process the plurality of training images. The plurality of training images can be preprocessed to establish boundaries of the training images. For example, the training image can be partially cropped and resized to a square by downsizing. In at least one embodiment, the pre-processing can include removal of any patterned data, such as labels or fiducial alignment marks, to keep the machine learning model from recognizing these patterned data elements as the condition. Additional image enhancement techniques can be performed during block 204 and are described further herein.

In block 206, the computer can establish the ground truth for class labels corresponding to colony morphology characteristics and various other conditions. Although an example condition is the too numerous to count condition, other conditions within the growth compartment as described herein. In at least one embodiment, block 206 can occur before or concurrently with block 208.

In at least one embodiment, the images from a training set are labeled to establish the ground truth and can be received from a data store. For example, the plurality of training images can be assigned pre-determined labels for each class (i.e., class labels). The class labels can be associated with different colony morphology characteristics or conditions. For example, an enterobacteriaceae plate type can have five class labels corresponding to colony morphology characteristics and the condition: red with gas, red with gas and acid, red with acid, blue, and a too numerous to count condition. Some of the plurality of training images are provided with class labels to establish the ground truth.

In at least one embodiment, at least some of the plurality of training images can have the condition (e.g., the too numerous to count condition) and additional class labels corresponding to a colony morphology characteristic. For example, for a training image with a too numerous to count condition and a red with gas colony morphology characteristic, the training image can establish the ground truth for both class labels.

In at least one embodiment, the ground truth for a condition can be established by a bounding box within or on the training image. The bounding box is defined based on the dimensions of the growth compartment of a culture device within the training image. For example, the machine learning model can use a bounding box to encompass an area of the training image that is intended to be a ground truth for the condition. The bounding box can be used on at least some of the plurality of training images in the training set (e.g., the training images with the condition). In at least one embodiment, the bounding box encompasses at least a majority of a growth compartment of a culture device on a training image. Thus, the bounding box also includes areas of the training image without the condition. In at least one embodiment, the class label is associated with the condition.

In at least one embodiment, the bounding box can be expanded past the colony morphology characteristic or the condition (e.g., the too numerous to count condition). For example, if a condition only covers a small portion of the growth compartment, then the bounding box can cover at least 50% of the growth compartment area (including areas or portions that do not have the condition).

The use of the bounding box with defined boundaries that encompass more than the area that indicate the condition is useful. Aspects of the technique can solve the technical problem of enabling more accurate detection of the underlying conditions (e.g., too numerous to count, which is more than individual colony forming units) on culture devices using a machine learning model, particularly neural network models. Aspects of the present disclosure were also unexpected since the bounding box is established for more than the useful area of the underlying condition.

Figure 3:
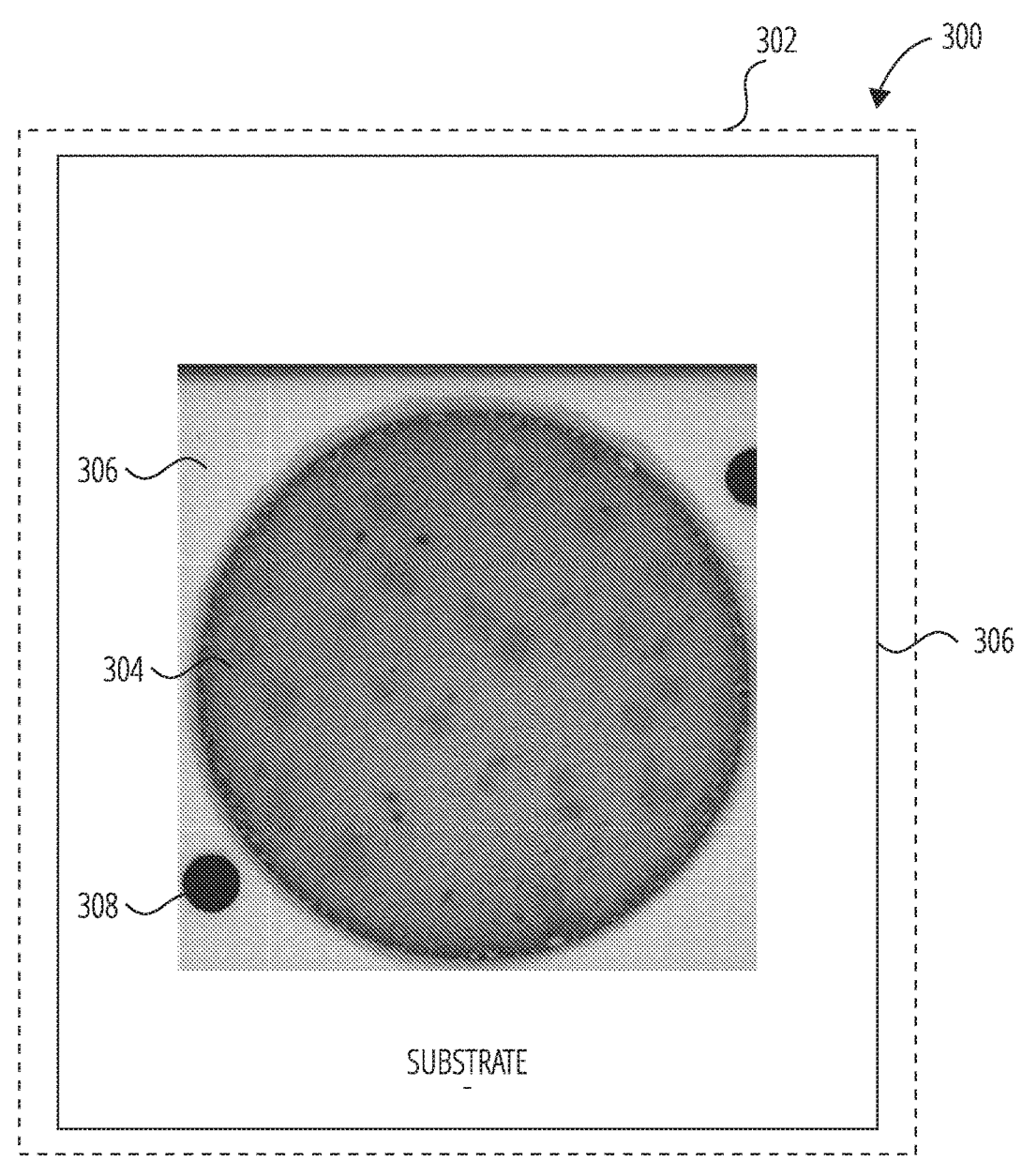
FIG. 3 illustrates a culture device image 300 in accordance with one embodiment.
Figure 4:
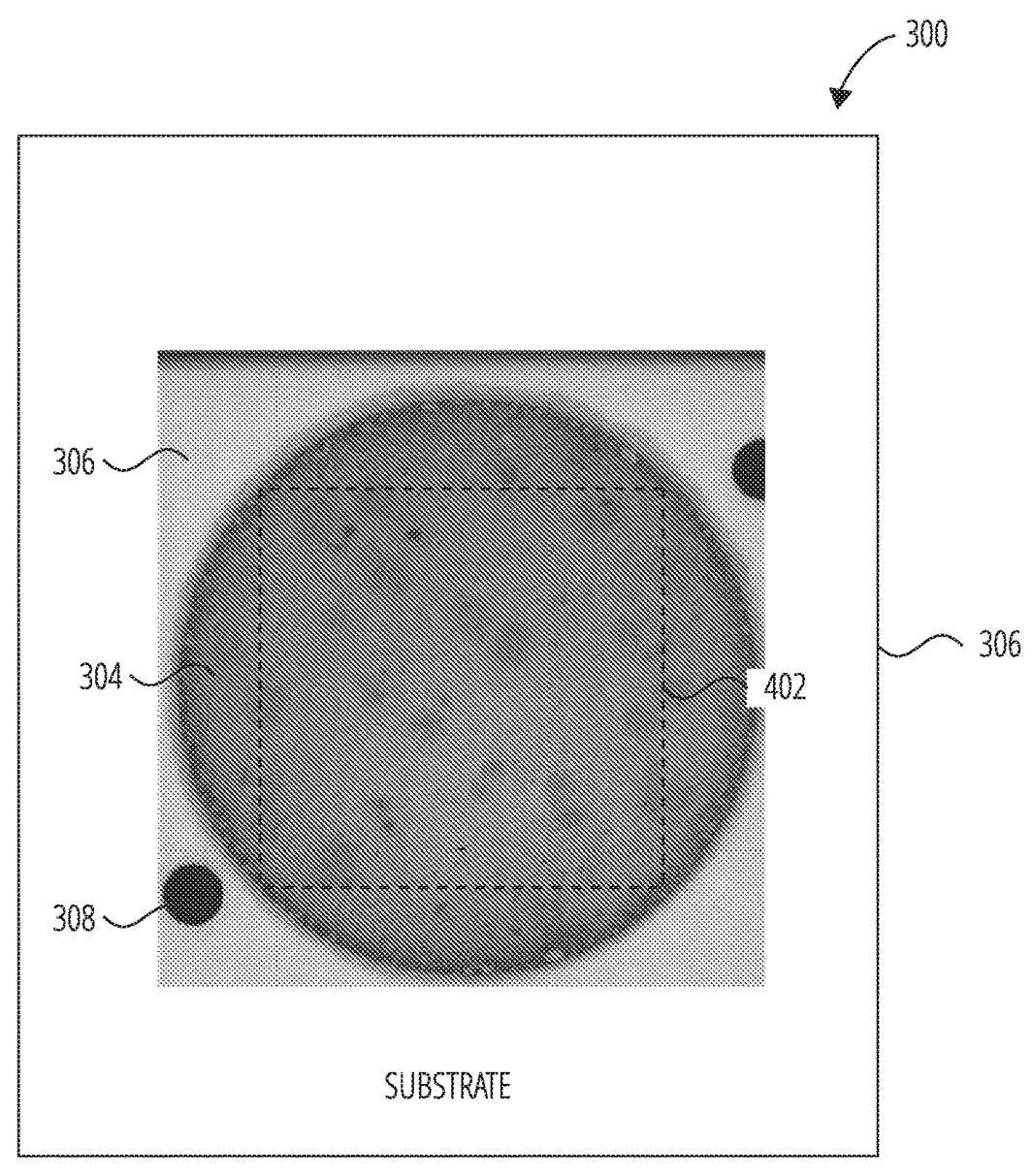
FIG. 4 illustrates a culture device image 300 in accordance with one embodiment.
Figure 5:
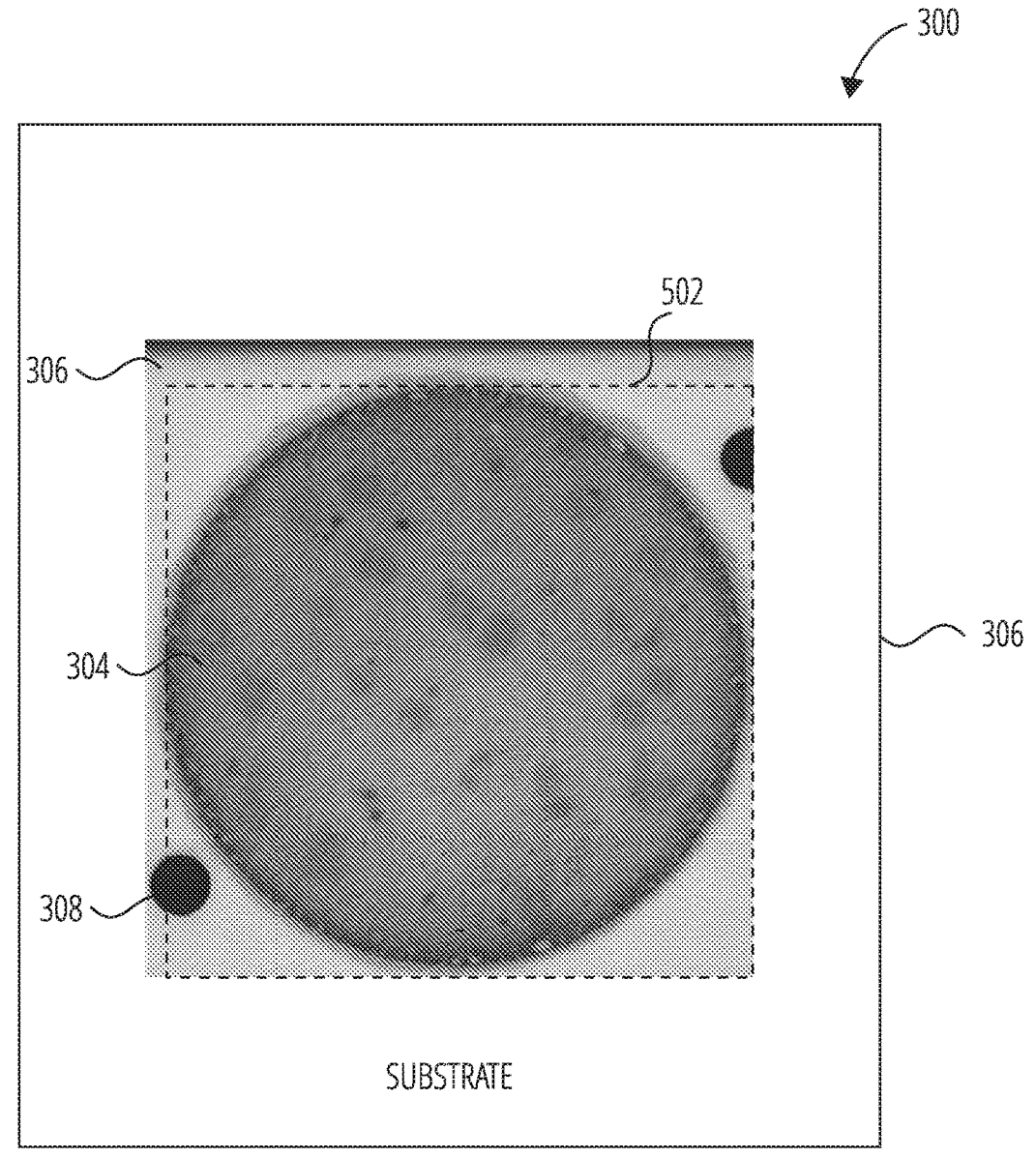
FIG. 5 illustrates a culture device image 300 in accordance with one embodiment.

The bounding box dimensions are described further herein with respect to FIG. 3, FIG. 4, and FIG. 5. Each of those figures illustrate different configurations of the bounding box.

The use of an expanded bounding box in the training image containing a majority of the culture device (including the portions without the condition) to establish a ground truth is counter intuitive and particularly important to the accuracy of the determination of too numerous to count conditions.

In block 208, the computer can provide a plurality of training images associated with a plurality of culture devices and the ground truth to a machine learning model. At least some of the plurality of training images can have a bounding box expanded past the condition or indication of the condition on the training image. The bounding box can establish the ground truth for the condition.

In at least one embodiment, a classifier can be trained on the plurality of training images having the class label that identifies the condition. The trained classifier can be utilized to receive and provide predicted results based on the input image (such as a too numerous to count condition class label).

If the trained classifier is a deep learning model as described further herein, then a number of parameters in the convolution layers of the deep learning model can be changed (e.g., weights of the hidden nodes) and applied to optimize the deep learning model output to the ground truth.

In at least one embodiment, the bounding boxes are provided to the machine learning model in block 208. In a deep learning model, the bounding box then trains the Regional Proposal Network to proposed bounded areas which may correspond to a class label from the plurality of training images. The bounded areas can then be fed to the classifier automatically.

In block 210, the computer can allow the classifier to analyze the plurality of training images to train the classifier.

In at least one embodiment, the plurality of training images can be at least one thousand training images and can be physically impossible for a human to classify. For example, the method 200 can occur in no greater than 2 hours for one thousand training images.

FIG. 3 illustrates a culture device image 300 with a bounding box 302 establishing a ground truth of a too numerous to count condition. The underlying culture device can have a substrate 306 with a growth compartment 304 formed therein. The growth compartment 304 can include a nutrient medium and the microorganic sample inoculated thereon. In at least one embodiment, a fiducial 308 can be present on the substrate 306 and captured on the culture device image 300. In at least one embodiment, if an agar plate is the culture device image 300, then the substrate 306 can be the surface that the culture device image 300 rests upon and that may be captured as background.

In culture device image 300, the bounding box 302 has dimensions that encompass the entire culture device image 300 (including the entire substrate 306). The bounding box 302 can also capture the fiducial 308. Thus, the entire area of bounding box 302 can be established as the ground truth for the too numerous to count condition.

FIG. 4 illustrates the culture device image 300 with a bounding box 402. The bounding box 402 encompasses a significant portion of the growth compartment 304 even though the too numerous to count condition may not exist on every pixel of the growth compartment 304. In at least one embodiment, the bounding box 402 has dimensions that would cover a majority (i.e., at least 50% of the area) of the growth compartment 304 of the culture device image 300.

FIG. 5 illustrates the culture device image 300 with bounding box 502. The bounding box 502 has dimensions that are configured to encompass an entire growth compartment 304 of culture device image 300 including a portion of the substrate 306. As shown, the bounding box 502 can also encompass portions of a fiducial 308.

Figure 6:
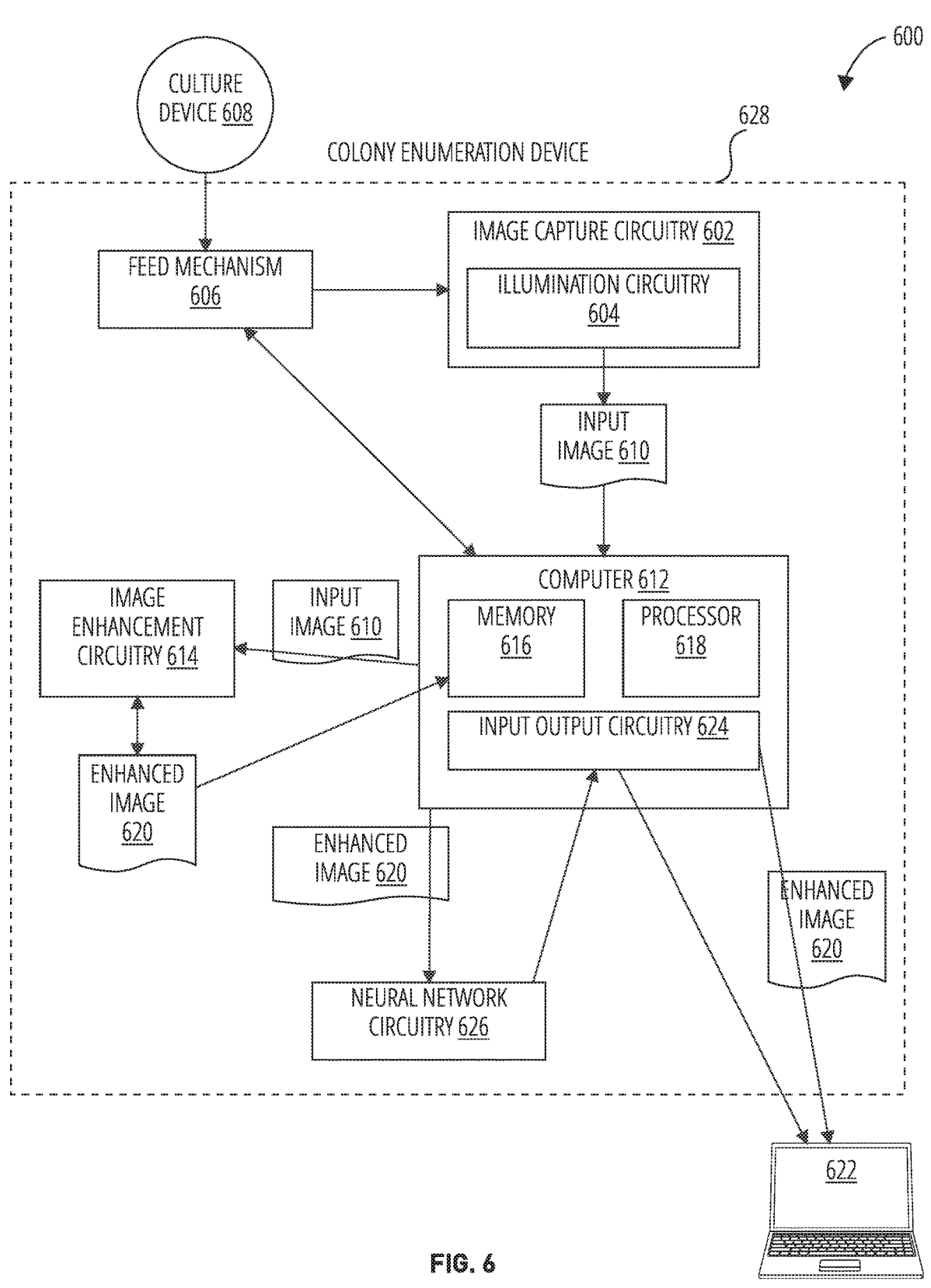
FIG. 6 illustrates a microorganic detection system 600 in accordance with one embodiment.

FIG. 6 illustrates a detailed overview of the microorganic detection system 600 performing aspects of FIG. 1 using a single image as an example. The microorganic detection system 600 can include colony enumeration device 628 and computer 622. In at least one embodiment, the functions of computer 622 such as the user interface can be merged into colony enumeration device 628.

Components of the colony enumeration device 628 include the image capture circuitry 602, the illumination circuitry 604, the feed mechanism 606, the computer 612, the image enhancement circuitry 614, the memory 616, the processor 618, computer 622, input output circuitry 624, and neural network circuitry 626.

In at least one embodiment, a culture device 608 can be received by feed mechanism 606. The image capture circuitry 602 causes illumination circuitry 604 to illuminate the culture device 608 and capture an input image 610 into memory 616. The image capture circuitry 602 can use two or more colors of an illumination setting and each illumination setting corresponds to a color channel. In at least one embodiment, the image capture circuitry 602 can use a color interpolation algorithm with a variable color ratio.

The image enhancement on input image 610 (i.e., optional pre-processing in block 104) can be performed by image enhancement circuitry 614 to form the enhanced image 620. The enhanced image 620 can be saved into the memory 616. The enhanced image 620 is provided to computer 622 via input output circuitry 624. The enhanced image 620 can optionally be provided to neural network circuitry 626 for identification of the condition as described herein.

Figure 7:
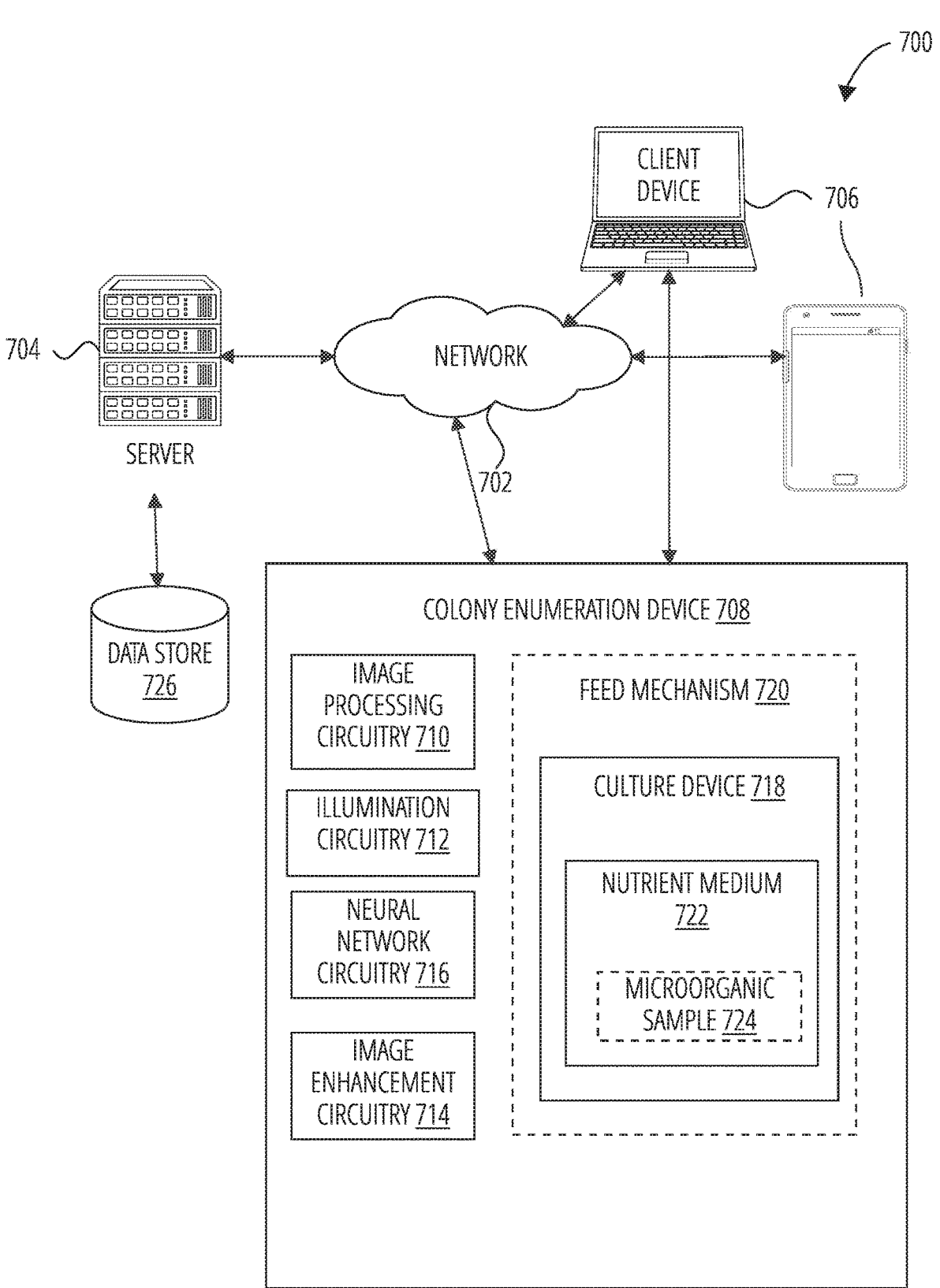
FIG. 7 illustrates a simplified microorganic detection system 700 in which a server 704 and a client device 706 are communicatively coupled via a network 702.

FIG. 7 illustrates a microorganic detection system 700 in which a server 704 and a client device 706 are connected to a network 702.

In various embodiments, the network 702 may include the Internet, a local area network ("LAN"), a wide area network ("WAN"), and/or other data network. In addition to traditional data-networking protocols, in some embodiments, data may be communicated according to protocols and/or standards including, Bluetooth, power-line communication ("PLC"), and the like. In some embodiments, the network 702 may also include a voice network that conveys not only voice communications, but also non-voice data such as Short Message Service ("SMS") messages, as well as data communicated via various cellular data communication protocols, and the like.

In various embodiments, the client device 706 may include desktop PCs, mobile phones, laptops, tablets, wearable computers, or other computing devices that are capable of connecting to the network 702 and communicating with the server 704, such as described herein. The client device 706 can perform functions of the external computer and the client device 706 can be an embodiment of an external computer described herein.

In various embodiments, additional infrastructure (e.g., short message service centers, cell sites, routers, gateways, firewalls, and the like), as well as additional devices may be present. Further, in some embodiments, the functions described as being provided by some or all of the server 704 and the client device 706 may be implemented via various combinations of physical and/or logical devices. However, it is not necessary to show such infrastructure and implementation details in FIG. 7 in order to describe an illustrative embodiment. In at least one embodiment, the server 704 can be communicatively coupled to a data store 726 such that data from the client device 706 can be transmitted to the data store 726 through the server 704.

In at least one embodiment, the microorganic detection system 700 can include a colony enumeration device 708 that is communicatively coupled to the client device 706. Preferably, the colony enumeration device 708 is connected to the client device 706 so that the client device 706 can perform Direct memory access (DMA) on the memory of colony enumeration device 708 (e.g., using USB DMA protocols). The colony enumeration device 708 can be configured to read a culture device 718. In at least one embodiment, the colony enumeration device 708 can be directly connected to the client device 706 without the use of a network 702. Aspects of the user interface can be integrated onto the colony enumeration device 708 itself.

The colony enumeration device 708 can have multiple subsystems to aid in the reading of culture device 718. For example, the colony enumeration device 708 can include image processing circuitry 710 to capture images of the culture device 718, image enhancement circuitry 714 to enhance images, an optional neural network circuitry 716 to enumerate and classify the culture device 718, and an optional feed mechanism 720 to automatically feed multiple culture devices 718 without user intervention. The image processing circuitry 710 can be configured to provide the images to the client device 706 for analysis. The image processing circuitry 710 can work in conjunction with illumination circuitry 712. The illumination circuitry 712 can include various lights and controllers to illuminate the culture device to be captured by the image processing circuitry 710. The image enhancement circuitry 714 and neural network circuitry 716 can be embedded in a system-on-module or single-board computer.

The culture device 718 can have growth compartment having a nutrient medium 722 contained therein. A microorganic sample 724 can be obtained from a sample of interest such as a food sample. The microorganic sample 724 can be applied to nutrient medium 722 such that the microorganism can proliferate.

Figure 8:
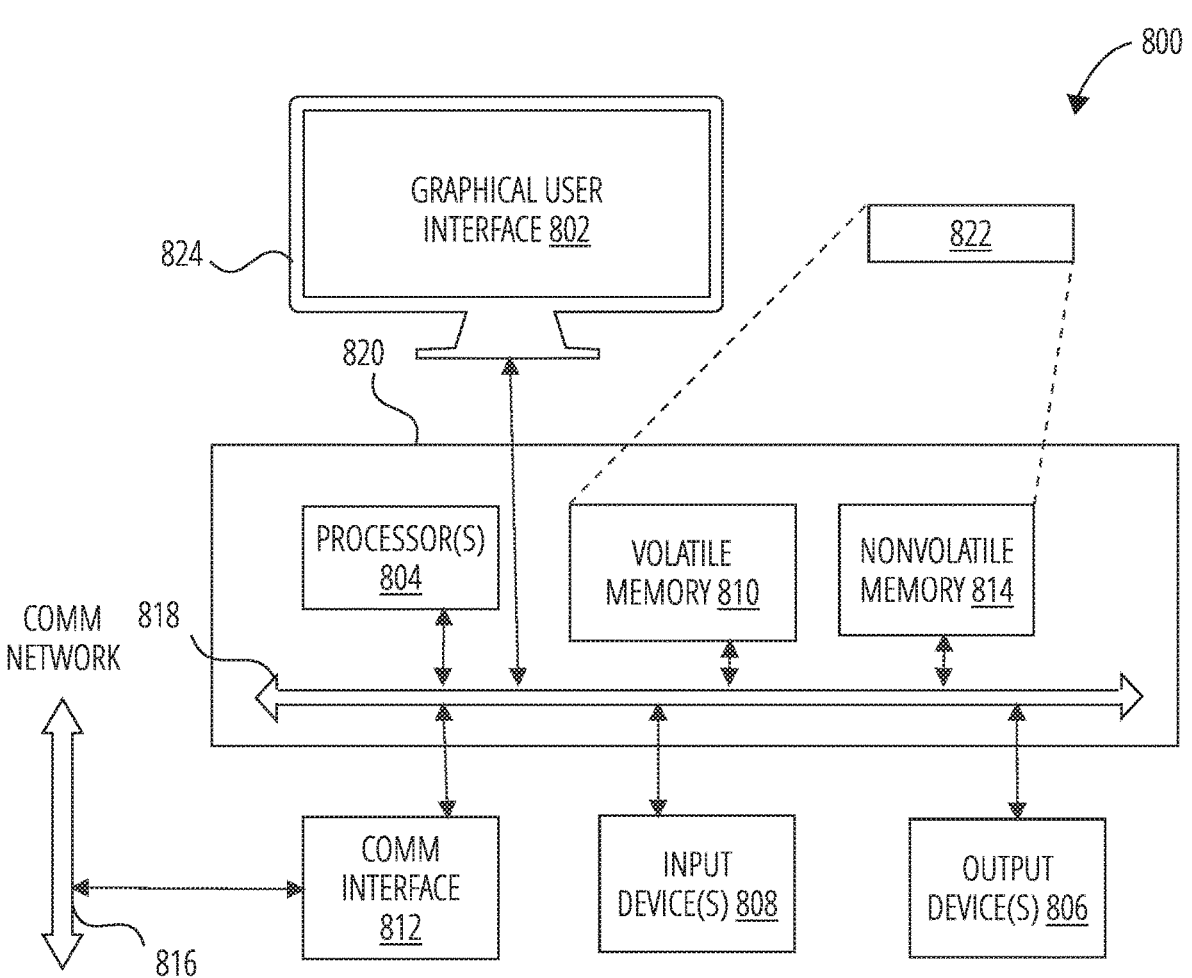
FIG. 8 is an example block diagram of a computer 800 that may incorporate embodiments of the present disclosure.

FIG. 8 is an example block diagram of a computer 800 that may incorporate embodiments of the colony enumeration device and/or external computer of the present disclosure. FIG. 8 is merely illustrative of a machine system to carry out aspects of the technical process described herein, and does not limit the scope of the claims. One of ordinary skill in the art would recognize other variations, modifications, and alternatives. In one embodiment, the computer 800 typically includes a graphical user interface 802, a data processing system 820, a communication network interface 812, input device(s) 808, output device(s) 806, and the like.

As depicted in FIG. 8, the data processing system 820 may include one or more processor(s) 804 that communicate with a number of peripheral devices via a bus subsystem 818. These peripheral devices may include input device(s) 808, output device(s) 806, communication network interface 812, and a storage subsystem, such as memory (e.g., a volatile memory 810 and a nonvolatile memory 814).

The volatile memory 810 and/or the nonvolatile memory 814 may store computer-executable instructions and thus forming logic 822 that when applied to and executed by the processor(s) 804 implement embodiments of the process disclosed herein.

The input device(s) 808 include devices and mechanisms for inputting information to the data processing system 820. These may include a keyboard, a keypad, a touch screen incorporated into the graphical user interface 802, audio input devices such as voice recognition systems, microphones, and other types of input devices. In various embodiments, the input device(s) 808 may be embodied as a computer mouse, a trackball, a track pad, a joystick, wireless remote, drawing tablet, voice command system, eye tracking system, and the like. The input device(s) 808 typically allow a user to select objects, icons, control areas, text and the like that appear on the graphical user interface 802 via a command such as a click of a button or the like.

The output device(s) 806 include devices and mechanisms for outputting information from the data processing system 820. These may include the display device 824 configured to display/project/present the graphical user interface 802, speakers, printers, infrared LEDs, and so on as well understood in the art.

The communication network interface 812 provides an interface to communication networks (e.g., communication network 816) and devices external to the data processing system 820. The communication network interface 812 may serve as an interface for receiving data from and transmitting data to other systems. Embodiments of the communication network interface 812 may include an Ethernet interface, a modem (telephone, satellite, cable, ISDN), (asynchronous) digital subscriber line (DSL), FireWire, USB, a wireless communication interface such as Bluetooth or WiFi, a cellular interface, and the like.

The communication network interface 812 may be coupled to the communication network 816 via an antenna, a cable, or the like. In some embodiments, the communication network interface 812 may be physically integrated on a circuit board of the data processing system 820, or in some cases may be implemented in software or firmware, such as "soft modems", or the like. The communication network 816 can further be communicative coupled to the colony enumeration device as described herein.

The computer 800 may include logic that enables communications over a network using protocols such as HTTP, TCP/IP, RTP/RTSP, IPX, UDP and the like.

The volatile memory 810 and the nonvolatile memory 814 are examples of tangible media configured to store computer readable data and instructions to implement various embodiments of the process described herein. Other types of tangible media include removable memory (e.g., pluggable USB memory devices, mobile device SIM cards), optical storage media such as CD-ROMS, DVDs, semiconductor memories such as flash memories, non-transitory read-onlymemories (ROMS), battery-backed volatile memories, networked storage devices, and the like. The volatile memory 810 and the nonvolatile memory 814 may be configured to store the basic programming and data constructs that provide the functionality of the disclosed process and other embodiments thereof that fall within the scope of the present disclosure.

Logic 822 that implements embodiments of the present disclosure may be stored in the volatile memory 810 and/or the nonvolatile memory 814. Said logic 822 may be read from the volatile memory 810 and/or nonvolatile memory 814 and executed by the processor(s) 804. The volatile memory 810 and the nonvolatile memory 814 may also provide a repository for storing data used by the logic 822.

The volatile memory 810 and the nonvolatile memory 814 may include a number of memories including a main random-access memory (RAM) for storage of instructions and data during program execution and a read only memory (ROM) in which read-only non-transitory instructions are stored. The volatile memory 810 and the nonvolatile memory 814 may include a file storage subsystem providing persistent (non-volatile) storage for program and data files. The volatile memory 810 and the nonvolatile memory 814 may include removable storage systems, such as removable flash memory.

The bus subsystem 818 provides a mechanism for enabling the various components and subsystems of data processing system 820 communicate with each other as intended. Although the communication network interface 812 is depicted schematically as a single bus, some embodiments of the bus subsystem 818 may utilize multiple distinct busses.

It will be readily apparent to one of ordinary skill in the art that the computer 800 may be a device such as a smartphone, a desktop computer, a laptop computer, a rack-mounted computer system, a computer server, or a tablet computer device. As commonly known in the art, the computer 800 may be implemented as a collection of multiple networked computing devices. Further, the computer 800 will typically include operating system logic (not illustrated) the types and nature of which are well known in the art.

Figure 9:
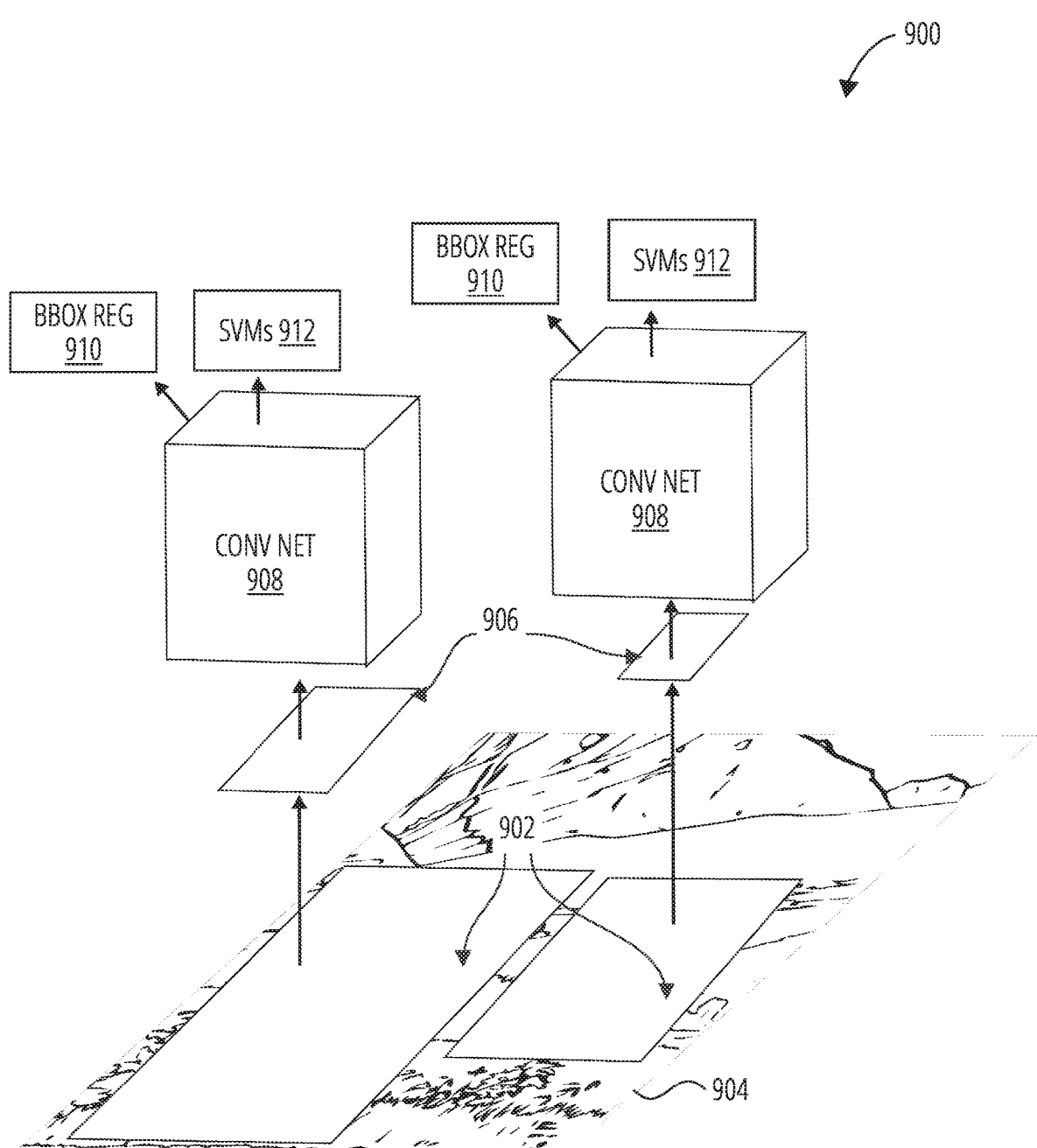
FIG. 9 illustrates a Region-based Convolution Network 900.

FIG. 9 illustrates an example of a Region-based Convolution Network 900 (R-CNN). Each region proposal feeds a convolutional neural network (CNN) to extract a features vector, possible objects are detected using multiple SVM classifiers and a linear regressor modifies the coordinates of the bounding box. The regions of interest (ROI 902) of the input image 904. Each ROI 902 of resized/warped creating the warped image region 906 which are forwarded to the convolutional neural network 908 where they are feed to the support vector machines 912 and bounding box linear regressors 910.

In R-CNN, the selective search method is an alternative to exhaustive search in an image to capture object location. It initializes small regions in an image and merges them with a hierarchical grouping. Thus, the final group is a box containing the entire image. The detected regions are merged according to a variety of color spaces and similarity metrics. The output is a few number of region proposals which could contain an object by merging small regions.

The R-CNN model combines the selective search method to detect region proposals and deep learning to find out the object in these regions. Each region proposal is resized to match the input of a CNN from which the method extracts a 4096-dimension vector of features. The features vector is fed into multiple classifiers to produce probabilities to belong to each class. Each one of these classes has a support vector machines 912 (SVM) classifier trained to infer a probability to detect this object for a given vector of features. This vector also feeds a linear regressor to adapt the shapes of the bounding box for a region proposal and thus reduce localization errors.

The CNN model described is trained on the training set described herein.

Figure 10:
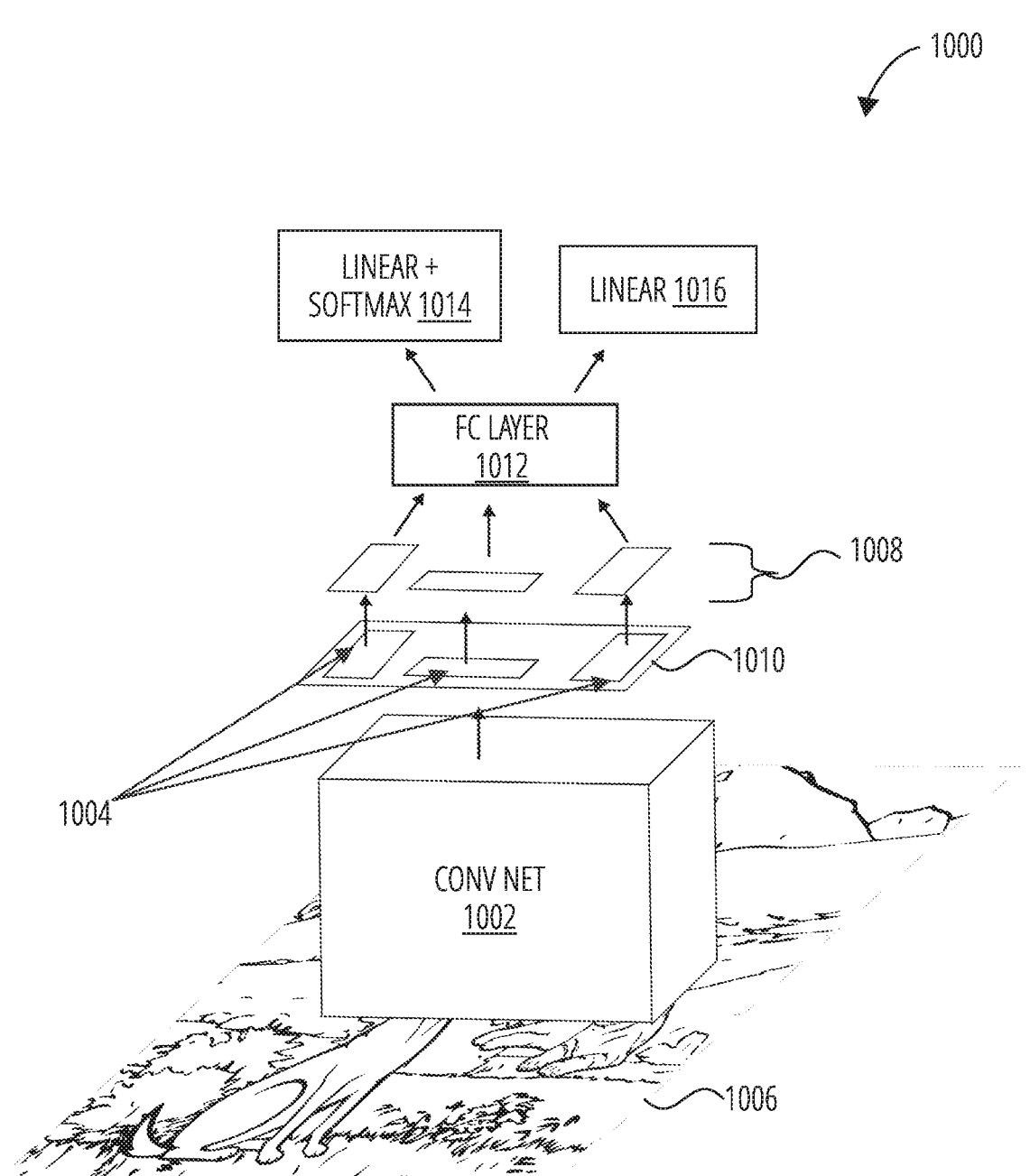
FIG. 10 illustrates a Fast Region-based Convolutional Network 1000.

FIG. 10 illustrates an example of a Fast Region-based Convolutional Network 1000 (Fast R-CNN). The entire image (input image 1006) feeds a CNN model (convolutional neural network 1002) to detect RoI (ROI 1004) on the feature maps 1010. Each region is separated using a RoI pooling layer (ROI pooling layer 1008) and it feeds fully connected layers 1012. This vector is used by a softmax classifier 1014 to detect the object and by a bounding box linear regressors 1016 to modify the coordinates of the bounding box. The purpose of the Fast R-CNN is to reduce the time consumption related to the high number of models used to analyze all region proposals.

A main CNN with multiple convolutional layers is taking the entire image as input instead of using a CNN for each region proposals (R-CNN). Region of Interests (RoIs) are detected with the selective search method applied on the produced feature maps. Formally, the feature maps size is reduced using a RoI pooling layer to get valid Region of Interests with fixed height and width as hyperparameters. Each RoI layer feeds fully-connected layers creating a features vector. The vector is used to predict the observed object with a softmax classifier and to adapt bounding box localizations with a linear regressor.

Figure 11:
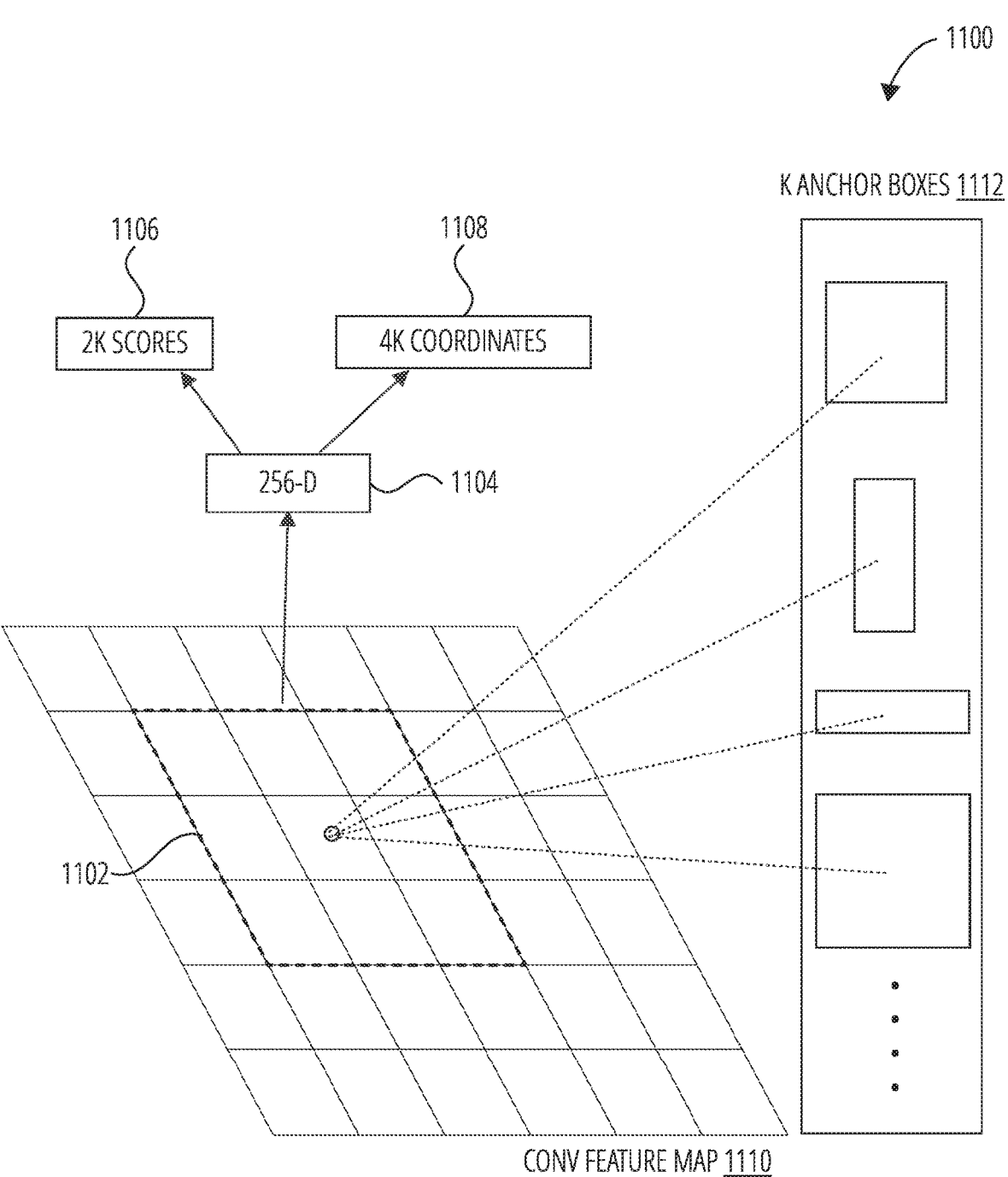
FIG. 11 illustrates a Faster Region-based Convolutional Network 1100.

FIG. 11 illustrates an example of a Faster Region-based Convolutional Network 1100 (Faster R-CNN).

Region proposals detected with the selective search method were still used in the previous model, which is computationally expensive. Region Proposal Network (RPN) was introduced to directly generate region proposals, predict bounding boxes (that may be within the bounding box established for the condition) and detect objects. The Faster R-CNN is a combination between the RPN and the Fast R-CNN model.

A CNN model takes as input the entire image and produces feature map 1110. A window of size 3×3 (sliding window 1102) slides all the feature maps and outputs a features vector (intermediate layer 1104) linked to two fully-connected layers, one for box-regression and one for box-classification. Multiple region proposals are predicted by the fully-connected layers. A maximum of k regions is fixed thus the output of the box regression layer 1108 has a size of 4k (coordinates of the boxes, their height and width) and the output of the box classification layer 1106 a size of 2k ("objectness" scores to detect an object or not in the box). The k region proposals detected by the sliding window are called anchors.

When the anchor boxes 1112 are detected, they are selected by applying a threshold over the "objectness" score to keep the relevant boxes. These anchor boxes and the feature maps computed by the initial CNN model feeds a Fast R-CNN model.

The entire image feeds a CNN model to produce anchor boxes as region proposals with a confidence to contain an object. A Fast R-CNN model can be used with the initial CNN model and take as inputs the feature maps and the region proposals. For each box, it produces probabilities to detect each object and correction over the location of the box.

Faster R-CNN uses RPN to avoid the selective search method, it accelerates the training and testing processes, and improve the performances. The RPN uses a pre-trained deep learning model on the training set for classification. Then the generated region proposals with anchor boxes are used to train the Fast R-CNN. This process is iterative.

"Area" refers to an area or region of an image encompassing a number of pixels.

"Artificial intelligence" refers to the theory and development of computer systems able to perform tasks that normally use human intelligence, such as visual perception, speech recognition, decision-making, and translation between languages. Broader than machine learning.

"Bounding box" refers to an imaginary box having coordinates of a rectangular border that fully encloses an area representing a ground truth on a digital image when it is placed on a bi-dimensional background.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out process or devices described herein, or a microprocessor configured by a computer program which at least partially carries out process or devices described herein), circuitry forming a memory device (e.g., forms of random access memory), or circuitry forming a communications device (e.g., a modem, communications switch, or optical-electrical equipment).

"Classifier" or "classification model" refers to a type of supervised machine learning model. A classifier can refer to a hypothesis or discrete-valued function that is used to assign categorical class labels to images or portions of images. The term classifier can include logistic regression, naive Bayes, decision tree, random forest and neural networks.

"Colony count" refers to a count of colony forming units for each microorganism type.

"Colony enumeration device" refers to an instrument used to detect biological events of samples on culture device. Examples of plate readers can include thin-film plate readers such as the 3M Petrifilm Colony enumeration device or other agar-based plate readers.

"Colony forming unit" refers to a unit used in microbiology to estimate the number of microorganisms in a sample.

"Colony morphology characteristic" refers to one or more forms of microorganisms that identify a microorganism or colony forming unit thereof in the culture device.

"Combined image" refers to an image that is comprised of a plurality of images from the different color channels. The color channels can be interleaved. Examples of combined images include RGB images.

"Corpus" refers to a collection of images in machine-readable form, assembled for the purpose of identifying colony forming units of microorganisms. The corpus can include identified colony forming units that are associated with known microorganisms.

"Culture device" refers to an article adapted to house a nutrient medium that facilitates the growth of a microorganism. Optionally, the culture device may comprise a lid or cover to minimize the exposure of the nutrient medium to external contamination and/or to reduce the loss of moisture from the culture medium during incubation and/or storage. The culture device can have a growth compartment and nutrient medium contained within the culture device. A microorganic sample can be received in the growth compartment. Nonlimiting examples of culture devices include flasks, beakers, tubes, Petri dishes, multi-well plates, PETRIFILM plates, COMPACT DRY media sheets, SANITA-KUN sheets, and the like. The culture device can be agar plates or an all-in-one plating system such as 3M Petrifilm. Articles of the present disclosure include thin film culture devices, such as those disclosed in U.S. Pat. Nos. 4,476,226; 5,089,413, and 5,232,838; which are incorporated herein by reference in their entirety.

"Deep learning model" refers to part of a broader family of machine learning methods based on artificial neural networks with representation learning. Learning can be supervised, semi-supervised or unsupervised. Most modern deep learning models are based on artificial neural networks, specifically, Convolutional Neural Networks (CNN)s, although they can also include propositional formulas or latent variables organized layer-wise in deep generative models such as the nodes in deep belief networks and deep Boltzmann machines. Deep learning model differs from an artificial neural network in that an artificial neural network includes one hidden layer whereas a deep learning model includes two or more hidden layers.

"Direct memory access" refers to a feature of computer systems that allows certain hardware subsystems to access main system memory (random-access memory), independent of the central processing unit (CPU). This can be distinct from Programmed input-output (PIO). DMA can be implemented in a variety of ways, e.g., external controller, internal memory controller, embedded in the system integration module in the processor, etc.

"External computer" refers to a computer that is attached to and/or distinct from the colony enumeration device. The external computer can be configured to allow a user to interact with images of the culture device. The external computer can have a separate processor and memory from the colony enumeration device. The external computer can also be capable of implementing a deep learning model.

"Feature extraction" refers to reducing dimensionality by which an initial set of raw data is reduced to more manageable groups for processing to remove irrelevant or redundant features. In image processing, feature extraction can include edge detection, corner detection, blob detection, ridge detection, scale-invariant feature transform, template matching, Hough transform, etc.

"Feed mechanism" refers to refers to an attachment for facilitating the transfer of a culture device into the colony enumeration device so that the colony enumeration device can capture an image of the culture device. The feed mechanism can include one or more servos and controllers to load the culture device. In at least one embodiment, the feed mechanism can be an autoloader attachment that loads a sequence of culture devices sequentially without user intervention.

"Firmware" refers to software logic embodied as processor-executable instructions stored in read-only memories or media.

"Ground truth" refers to an expected result that a machine learning model is testing itself against. For example, the ground truth can be an image of a colony morphology characteristic having a particular class label. For example, the ground truth can also be a known class label.

"Growth compartment" refers to the space in which the microorganisms grow. The growth compartment can include the nutrient medium, the microorganic sample, and the volume of air around them. The term growth compartment can include an inoculation zone.

"Image" refers to an image of the culture device. Can include either the microorganic sample or can be a reference.

"Image enhancement" refers to mathematical techniques to improve quality of an image for automated image analysis systems. Additional techniques are further described on Raman B. Paranjape, Handbook of Medical Imaging, Biomedical Engineering, page 3 (2000).

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Machine learning" refers to computer algorithms that improve automatically through experience. Subset of artificial intelligence.

"Microorganic sample" refers to a sample having microorganisms. Bacterial species of interest can be analyzed in a microorganic sample that may be derived from any source, such as a physiological fluid, e.g., blood, saliva, ocular lens fluid, synovial fluid, cerebral spinal fluid, pus, sweat, exudate, urine, mucus, mucosal tissue (e.g., buccal, gingival, nasal, ocular, tracheal, bronchial, gastrointestinal, rectal, urethral, ureteral, vaginal, cervical, and uterine mucosal membranes), lactation milk, feces or the like. Further, the sample may be derived from a body site, e.g., wound, skin, anterior nares, nasopharyngeal cavity, nasal cavities, anterior nasal vestibule, scalp, nails, outer ear, middle ear, mouth, rectum, vagina, axilla, perineum, anus, or another similar site. Besides physiological fluids, other microorganic sample may include other liquids as well as solid(s) dissolved or suspended in a liquid medium. Samples of interest may include process streams, water, food, food ingredients, beverages, soil, plants or other vegetation, air, surfaces (e.g., walls, floors, equipment, utensils in a manufacturing plant, hospital, clinic, or home, for example), and the like. Preferably, the microorganic sample can be collected via a food matrix.

"Microorganism" refers to a microscopic organism such as a bacteria, virus, or fungus. The term microorganism can also refer to a microorganism that is targeted to be analyzed such as a microorganism bacteria that causes disease, preferably those commonly associated with food contamination, including, for example, aerobic bacteria, *E. coli.*, coliforms, enterobacteria, yeast, mold, *Staphylococcus aureus, Listeria, Campylobacter, Shigella, Salmonella*, and the like.

"Nutrient medium" refers to a solid, liquid or semi-solid designed to support the growth of microorganisms or cells. The nutrient medium typically comprises at least one nutrient selected from the group consisting of a meat peptone, a casein peptone, a gelatin peptone, a soy peptone, a beef extract, a yeast extract, lactose, glucose, dextrose, tryptose, galactose, tryptone, a fat, a mineral, or a vitamin.

"Plate type" refers to properties of a culture device that allows the culture device to proliferate selected microorganisms. Some plate types are non-specific to the species. Others, like the lactic acid plates, are specific to the genus but not the species.

"Reading" refers to capturing sample data relating to the culture device. This can be performed by optical means (e.g., an image processing circuitry). The term "read" can be used to refer to the act of obtaining a reading. The reading can be performed by the colony enumeration device at the direction of the computer. The term "reading" can be associated with the term "capturing". "Capturing" can refer to an act of the colony enumeration device. The term "reading" can also include the analysis performed on the sample data whether the analysis is performed on the colony enumeration device or computer.

"Single-board computer" refers to a computer built on a single circuit board. Single-board computer can refer to a combination where a system-on-module or computer-on-module is plugged into interface circuitry.

"Software" refers to logic implemented as processor-executable instructions in a machine memory (e.g., read/write volatile or nonvolatile memory or media).

"Some" refers to an amount that is less than all

"System-on-module" refers to a board-level circuit that integrates a system function in a single module. It may integrate digital and analog functions on a single board. System-on-module can connect to interface circuitry to communicate with peripherals. Examples of system-on-module are commercially available from NVIDIA (Santa Clara, CA) under the trade designation Jetson (e.g., Models TX1, TX2, Nano, or Xavier).

"Too numerous to count condition" refers to belonging in the too numerous to count class. The too numerous to count condition can include various indications that there are more colony forming units than can be accurately counted.

"Trained classifier" refers to a classifier that is trained on a plurality of training images.

"Training set" refers to a corpus of training images and associated class labels.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise. The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a", "an", "the", "at least one", and "one or more" are used interchangeably. Thus, for example, a nutrient can be interpreted to mean "one or more" nutrients.

The term "and/or" means one or all of the listed elements or a combination of any two or more of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

LIST OF ILLUSTRATIVE EMBODIMENTS

1. A method of processing an input image of a culture device for a condition, comprising: receiving the input image;
   classifying the input image with a trained machine learning model that is configured to be trained on a training set of images having the condition;
   determining that the condition exists in the input image based on the classification; performing at least one action in response to the determination that the condition exists.
2. The method of embodiment 1, wherein the trained machine learning model is a deep learning model using a neural network circuitry, further comprising:
   extracting, with the deep learning model, a proposed region of the input image, the input image being an input to the deep learning model; and
   classifying, with a trained classifier, the input image based on the proposed region, the proposed region being an input to the trained classifier.
3. The method of embodiment 1 or 2, wherein the determining that the condition exists comprises:
   applying the trained machine learning model to the image to determine a probability that the condition exists in the proposed region and an extent of the proposed region;
   determining if the probability and the extent are within a threshold; and
   determining that the condition exists if the threshold is satisfied by the probability and the extent.
4. The method of any of embodiments 1 to 3, wherein performing at least one action comprises communicating to a user interface on a display device that the condition exists for the image.
5. The method of any of embodiments 1 to 4, further comprising preprocessing the input image.
6. The method of any of embodiments 1 to 5, wherein performing at least one action comprises ejecting, with a feed mechanism, the culture device.
7. The method of any of embodiments 1 to 6, wherein the trained machine learning model does not use a neural network.
8. The method of any of embodiments 1 to 7, wherein the condition is a too numerous to count condition or indication thereof.
9. A non-transitory computer-readable storage medium including instructions that, when processed by a computer, configure the computer to perform the method of any of embodiments 1 to embodiment 8.
10. A colony enumeration device comprising:
    neural network circuitry configured to use a trained machine learning model;
    a processor; and
    a memory storing instructions that, when executed by the processor, configure the colony enumeration device to:
      receive the input image of a culture device having a condition;
      classify, using the neural network circuitry, the input image with the trained machine learning model that is configured to be trained on a training set of images having the condition;

determine that the condition exists in the input image based on the classification;
      perform at least one action in response to the determination that the condition exists.
11. The colony enumeration device of embodiment 10, wherein the determining that the condition exists comprises:
    applying the trained machine learning model to the image to determine a probability that the condition exists in a proposed region and an extent of the proposed region;
    determining if the probability and the extent are within a threshold; and
    determining that the condition exists if the threshold is satisfied by the probability and the extent.
12. The colony enumeration device of embodiment 10 or 11, wherein performing at least one action comprises communicating to a user interface on a display device that the condition exists for the image.
13. The colony enumeration device any of embodiments 1 to 12, wherein performing at least one action comprises segregating the culture device from a plurality of culture devices using a feed mechanism on the colony enumeration device.
14. A method of training a machine learning model to classify a condition on a culture device, comprising:
    receiving a training set comprising a plurality of training images related to a plurality of culture devices;
    establishing a ground truth for a class label with a bounding box on at least some of the plurality of training images in the training set, the bounding box encompasses at least a majority of a growth compartment of a culture device on a training image, wherein the class label is associated with the condition;
    providing the training set to the machine learning model; and
    allowing the machine learning model to analyze the plurality of training images to train the machine learning model and form a trained machine learning model.
15. The method of embodiment 14, wherein the condition is a too numerous to count condition or indication thereof.
16. The method of embodiment 14 or 15, wherein the bounding box is expanded past the condition on the training image to establish the ground truth.
17. The method of any of embodiments 1 to 16, further comprising pre-processing the plurality of training images from the training set.
18. The method of embodiment 17, wherein the plurality of training images are partially cropped.
19. The method of any of embodiments 1 to 18, the bounding box includes areas of the training image without the condition.
20. The method of any of embodiments 1 to 19, wherein the bounding box does not encompass a substrate of the culture device.
21. The method of any of embodiments 1 to 20, wherein the bounding box encompasses an entire growth compartment of the culture device.
22. The method of embodiment 21, wherein the bounding box encompasses at least a portion of a substrate.
23. The method of embodiment 22, wherein the bounding box encompasses an entire culture device in the training image.

24. The method of embodiment 22 or 23, wherein the bounding box encompasses a fiducial on the substrate.

25. The method of any of embodiments 1 to 26, further comprising providing the trained machine learning model to a colony enumeration device, the colony enumeration device configured to analyze a plurality of input images.

26. A non-transitory computer-readable storage medium including instructions that, when processed by a computer, configure the computer to perform the method of any of one of embodiments 14 to embodiment 25.

27. The method of any of embodiments 1 to 13, further comprising training the machine learning model using the method of any of embodiments 14 to 24.

27. A computer, the computer comprising:
    a neural network circuitry configured to use a machine learning model;
    a processor; and
    a memory storing instructions that, when executed by the processor, configure the computer to:
        receive a training set comprising a plurality of training images related to a plurality of culture devices, some of the plurality of culture devices have a condition;
        establish a ground truth for a class label with a bounding box on at least some of the plurality of training images in the training set, the bounding box encompasses at least a majority of a growth compartment of a culture device on a training image, the bounding box includes areas of the training image without the condition, wherein the class label is associated with the condition;
        provide the training set to the machine learning model running on the neural network circuitry;
        allow the machine learning model to analyze the plurality of training images to train the machine learning model and form a trained machine learning model.

28. The computer of embodiment 27, wherein the bounding box is expanded past the condition on the training image to establish the ground truth.

29. The computer of embodiment 27 or 28, wherein the bounding box does not encompass a substrate of the culture device.

30. The computer of any of embodiments 27 to 29, wherein the bounding box encompasses an entire growth compartment of the culture device.

31. The computer of embodiment 30, wherein the bounding box encompasses at least a portion of a substrate.

32. The computer of embodiment 31, wherein the bounding box encompasses an entire culture device in the training image.

33. The computer of any of embodiments 27 to 32, wherein the memory stores instructions that, when executed by the processor, configure the computer to: provide trained machine learning model to a colony enumeration device for colony enumeration of an input image.

34. The computer of any of embodiments 27 to 33, wherein the computer is a colony enumeration device.

35. The computer of any of embodiments 27 to 34, wherein the computer is part of a microorganic detection system.

What is claimed is:

1. A method of processing, using a colony enumeration device, an input image of a culture device for a condition, comprising:

receiving, by the colony enumeration device, the input image;
    classifying, on the colony enumeration device, the input image with a machine learning model, the machine learning model that is configured to be trained on a training set of images having the condition;
    determining that the condition exists in the input image based on the classification;
    performing at least one action in response to the determination that the condition exists;
    wherein the condition is a too numerous to count condition or indication thereof;
    further comprising training the machine learning model on the training set of images to classify a condition on the culture device;
    wherein training the machine learning model further comprises:
    receiving the training set of images comprising a plurality of training images related to a plurality of culture devices:
    establishing a ground truth for a class label with a bounding box on at least some of the plurality of training images in the training set, the bounding box encompasses at least a majority of a growth compartment of a culture device on a training image, wherein the class label is associated with the condition;
    providing the training set of images to the machine learning model; and
    allowing the machine learning model to analyze the plurality of training images to train the machine learning model and form a trained machine learning model.

2. The method of claim 1, wherein the machine learning model is a deep learning model using a neural network circuitry, further comprising:
    extracting, with the deep learning model, a proposed region of the input image, the input image being an input to the deep learning model; and
    classifying, with a classifier, the input image based on the proposed region, the proposed region being an input to the classifier.

3. The method of claim 1, wherein the determining that the condition exists comprises:
    applying the machine learning model to the image to determine a probability that the condition exists in the proposed region and an extent of the proposed region;
    determining if the probability and the extent are within a threshold; and
    determining that the condition exists if the threshold is satisfied by the probability and the extent.

4. The method of claim 1, wherein performing at least one action comprises communicating to a user interface on a display device that the condition exists for the image.

5. The method of claim 1, wherein performing at least one action comprises ejecting, with a feed mechanism, the culture device.

6. The method of claim 1, wherein the bounding box is expanded past the condition on the training image to establish the ground truth.

7. The method of claim 1, further comprising pre-processing the plurality of training images from the training set.

8. The method of claim 1, wherein the plurality of training images are partially cropped.

9. The method of claim 1, the bounding box includes areas of the training image without the condition.

10. The method of claim 1, wherein the bounding box does not encompass a substrate of the culture device.

11. The method of claim 10, wherein the bounding box encompasses an entire growth compartment of the culture device.

12. The method of claim 11, wherein the bounding box encompasses at least a portion of a substrate.

13. The method of claim 12, wherein the bounding box encompasses an entire culture device in the training image.

14. The method of claim 12, wherein the bounding box encompasses a fiducial on the substrate.

15. The method of claim 1, further comprising providing the trained machine learning model to a colony enumeration device, the colony enumeration device configured to analyze a plurality of input images.

16. A colony enumeration device comprising:

neural network circuitry configured to use the machine learning model;

a processor; and a memory storing instructions that, when executed by the processor, configure the colony enumeration device to perform the method of claim 1.

* * * * *